Aug. 10, 1943. G. F. WALES 2,326,588
CLAMPING MECHANISM FOR PERFORATING APPARATUS AND OTHER PARTS
Filed March 14, 1942 2 Sheets-Sheet 1
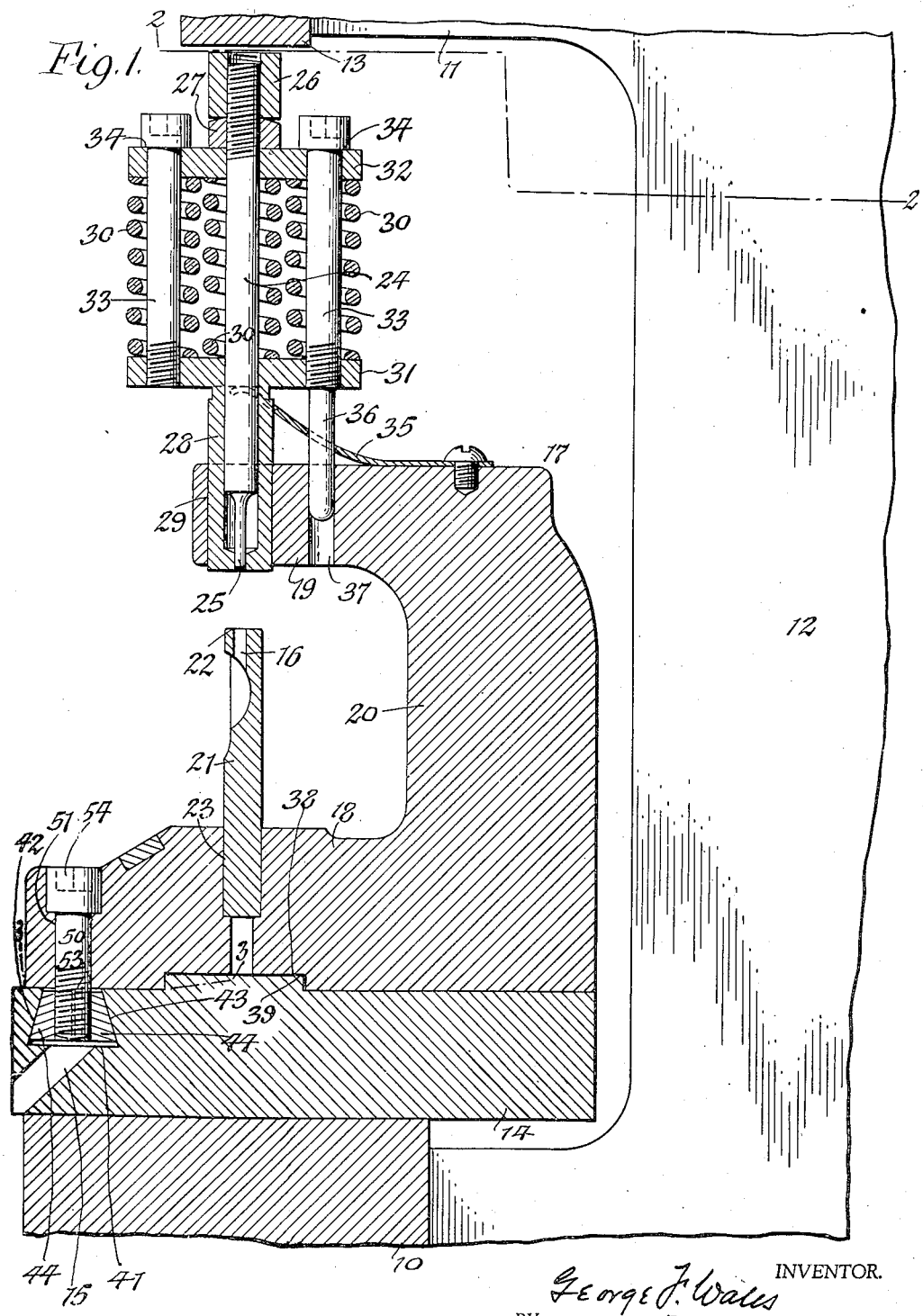
INVENTOR.
George F. Wales
BY
ATTORNEYS Aug. 10, 1943.   G. F. WALES   2,326,588
CLAMPING MECHANISM FOR PERFORATING APPARATUS AND OTHER PARTS
Filed March 14, 1942   2 Sheets-Sheet 2
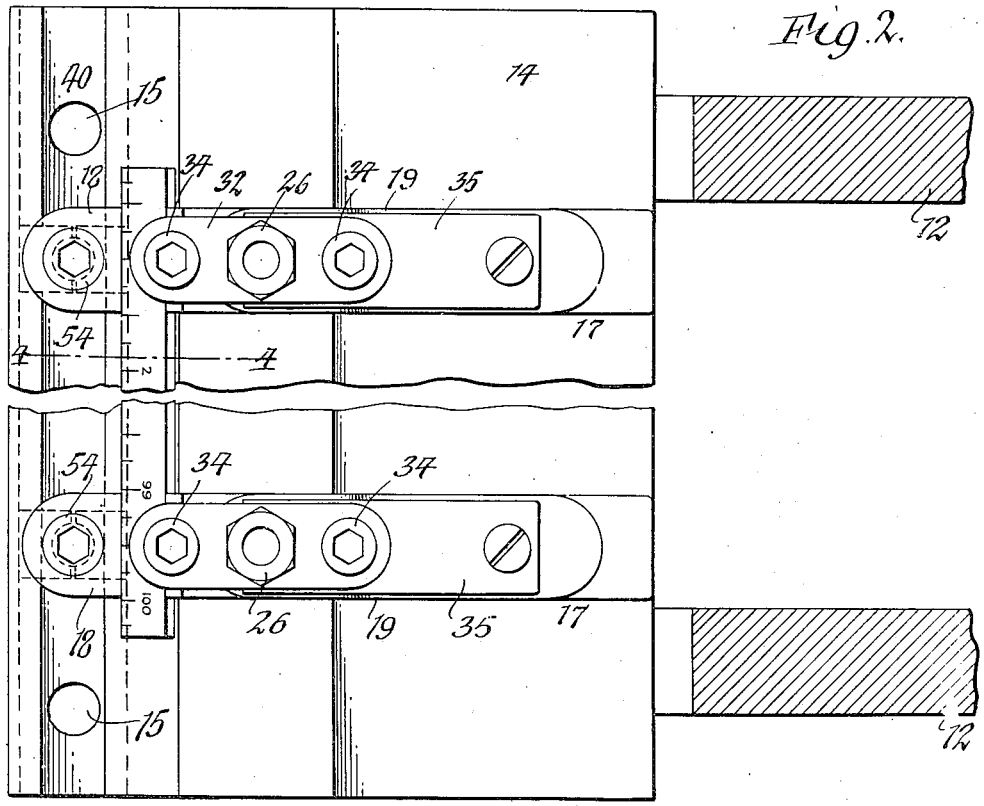
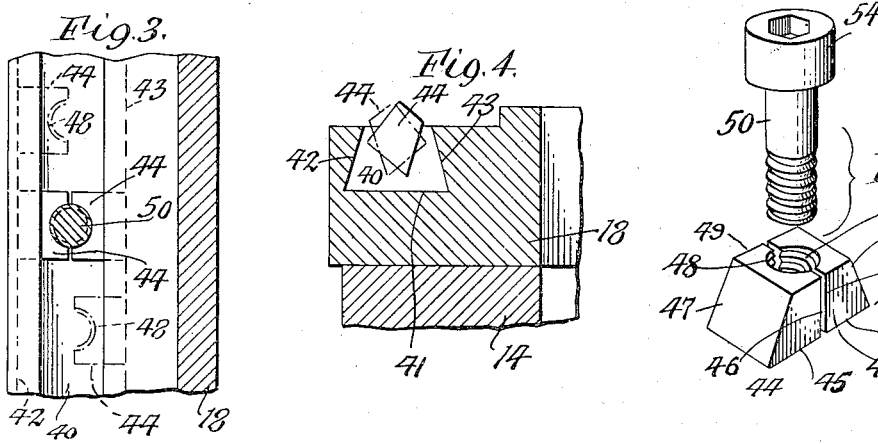
INVENTOR.
George F. Wales
BY
Popp & Popp
ATTORNEYS Patented Aug. 10, 1943

2,326,588

UNITED STATES PATENT OFFICE 2,326,588

CLAMPING MECHANISM FOR PERFORATING APPARATUS AND OTHER PARTS

George F. Wales, Kenmore, N. Y.

Application March 14, 1942, Serial No. 434,724

5 Claims. (Cl. 164—118)

This invention relates to a clamping device which is adapted to connect two parts which are adjustable laterally relative to one another and while the same can be used for connecting various members of this character the same is shown in the present instance, for example, in connection with a perforating apparatus which embodies a plurality of perforating units each of which comprises a holder, and cooperating die and punch members for producing a hole in a workpiece, and adjusting means whereby each unit may be shifted lengthwise of the apparatus for varying the location of the hole to be produced in the workpiece.

An apparatus of this general character is shown in Letters Patent of the United States No. 2,163,641, granted to myself June 27, 1939.

In this patent the holder of each perforating unit is adjustably secured to a horizontal supporting rail by means of a bolt passing through the holder and engaging with a nut arranged in an undercut or T-slot in the rail. When mounting the holder of a perforating unit of this character on a rail it was necessary to slip a clamping nut into the undercut slot or groove of the rail preparatory to receiving the clamping screw which was connected with the holder. When it became necessary to dismount a holder for servicing the parts thereof this holder could be disconnected from the clamping nut after the clamping screw was disengaged from the clamping nut and the latter could be left in the undercut groove and in position to again receive the clamping screw of the respective holder.

When a situation arose which required the mounting of a perforating unit on the rail between units of a group already mounted on the rail, this could heretofore only be done by disconnecting the clamping screws of the several holders on one side of the desired location and pushing the row of detached nuts in the undercut groove lengthwise therein so that the innermost one of the respective group was advanced to the desired location of the perforating unit which was added to the intermediate part of the group.

In anticipation of the possibility of adding a perforating unit to an intermediate part of a group already mounted on a rail extra idle clamping nuts could be placed in the undercut groove and thus permit of adding a perforating unit to an intermediate part of a group of such units, provided there was sufficient room in this groove to store these spare nuts.

The principal object of this invention is to provide clamping means for connecting two members, such as a rail and a die and punch holder, by means of a clamping screw and nut, which permits of mounting the detachable member of a complementary pair within the intermediate part of a group of such members and also dismounting the same without disturbing the other detachable members of this group, and also without requiring any idle screw nuts to be placed in the undercut groove as a reserve for possible use.

A further object of this invention is to provide simple, efficient and durable means whereby a perforating unit or the like can be directly applied to and removed from any part of the rail without disturbing any of the other perforating units, thereby expediting this work and saving time and expense usually attending the servicing of the perforating units for this purpose.

In the accompanying drawings:

Fig. 1 is a fragmentary cross section of a punching apparatus showing a perforating unit secured in its adjusted position by means of this invention.

Fig. 2 is a top plan view of the same with parts of the press in section taken on line 2—2, Fig. 1.

Fig. 3 is a fragmentary horizontal section, taken on line 3—3, Fig. 1.

Fig. 4 is a fragmentary vertical transverse section, taken on line 4—4, Fig. 2, but showing the manner in which the screw coupling sections are introduced into an undercut groove.

Fig. 5 is a perspective view of the screw and nut of a bolt forming part of the clamping means for holding each perforating unit in place on the supporting rail of a press.

In the following description similar reference characters indicate like parts in the several figures of the drawings.

In general the punching apparatus shown in the drawings is constructed like that shown in my pending United States patent application, Ser. No. 426,447 and may be briefly summarized as follows, but reference may be had to this prior application for a detailed description of the same.

The numeral 10 represents the lower supporting bed forming part of the main frame of a press and 11 the upper guide head thereof which has its rear part connected by an upright arm 12 with the corresponding rear part of the bed. Above the bed is arranged the ram 13 of the press which is guided on the frame head and reciprocated vertically by any suitable means. Upon the bed is mounted a horizontal supporting rail 14 which is provided on its upper side with a horizontal longitudinal rib 39.

The numeral 17 indicates, in general, a holder which together with a die, a punch and a stripping mechanism associated therewith, forms a perforating unit whereby holes may be punched in a workpiece, the latter being removed from the punch after the perforating operation. The holder shown in the drawings comprises a lower shoe 18, an upper horn 19 and an upright standard or arm 20 connecting the rear parts of the shoe and horn.

The numeral 21 represents an upright tubular die which is provided at its upper end with an opening 16 having the usual cutting edge 22 while its lower end is seated in a socket 23 in the shoe of the holder.

The numeral 24 represents an upright punch which is provided at its lower end with a bit 25 adapted to cooperate with the cutting edge of the die opening for producing a hole in the workpiece. This punch is depressed by engagement of the ram with a head 26 which is adjustably mounted on the upper end of the punch and held in place thereon by a clamping nut 27. The lower part of the punch slides vertically in a stripping and guiding tube 28 which reciprocates vertically in a guide opening 29 in the horn of the die and punch holder. The punch is yieldingly held in an elevated position relative to the stripping sleeve by stripper springs 30 interposed between a lower cross bar 31 connected with the upper end of the stripping tube 28 and an upper cross bar 32 sliding on the punch and engaging with the underside of the clamping screw nut 27. The lifting movement of the punch under the action of the stripper springs 30 is limited by upright tie rods 33 which are connected at their lower ends with the lower cross bar 31 and provided at their upper ends with heads or shoulders 34 which are engaged by the upper side of the upper cross bar 32. The stripper springs preferably surround the punch and the tie rods. The punch, guide tube, and stripper springs and the parts associated therewith are raised by a lifting spring 35 connected with the horn of the holder and bearing against the lower cross bar 31 of the stripping mechanism. Rotation of the punch guide sleeve or tube and the stripping mechanism is prevented by a retaining pin 36 projecting downwardly from one of the tie rods and sliding in a vertical guide opening 37 in the horn of the holder.

The die and punch holder is provided on the underside of its shoe with a groove 38 which receives the horizontal rib 39 arranged lengthwise on the upper side of the supporting rail 14. By these means the holder when free can be moved lengthwise of the press for adjusting the die and punch of the respective perforating unit to the desired position for producing a hole in the required part of the workpiece, but the holder is prevented from moving fore and aft or crosswise of the press.

The means whereby the die and punch holder is secured in its longitudinally adjusted position on the supporting rail 14 and which embody this invention are constructed as follows:

The numeral 40 represents a horizontal adjusting groove formed lengthwise in the upper side of the supporting rail and extending lengthwise of the press as a whole. The bottom 41 of this adjusting groove is flat and its opposite front and rear sides 42, 43 are inclined and converge upwardly so that this groove is undercut and of upwardly tapering form in cross section, as shown in Figs. 1 and 4.

Within this adjusting groove is arranged the screw nut of an adjusting bolt and on the shoe of the die and punch holder is mounted the screw of this bolt which cooperates with this screw nut for fastening the die and punch holder in its adjusted position to the supporting rail.

This screw nut is split diametrically to form two coupling sections 44 each of which has a flat underside 45, a flat top, a vertical inner side 46, an inclined outer side 47, a vertical semi-circular recess 48 on its inner side which is provided with one-half of a helical screw thread, and two opposite upright transverse sides 49. In the operative position of the screw nut or coupling sections the vertical inner sides 46 of the same face each other and their outer inclined sides converge or taper upwardly.

The body or shank 50 of the screw of this fastening bolt is arranged in a vertical opening 51 in the front part of the holder shoe and the screw thread 52 on the lower end of this body engages with the threads of the recesses 48 which are arranged on the inner side of the screw nut sections and which together form a threaded opening for the screw nut. The head 54 at the upper end of the body of the fastening bolt bears against the upper side of the front part of the holder shoe. When the clamping screw is loose the sections of the clamping nut do not grip the opposite sides of the adjusting groove in the rail, thereby permitting the die and punch holder to be moved lengthwise of the rail for bringing the perforating unit into position to produce a hole in the desired part of the workpiece.

Upon tightening the clamping screw 50, the two sections of the clamping nut are drawn upwardly, whereby the threaded inner sides of the same will be pressed against opposite sides of the clamping screw due to the wedge action of the inclined outer sides of these nut sections against the opposite inclined sides of the adjusting groove in the rail, and the die and punch holder will also be pressed downwardly upon this rail, thereby securely fastening the perforating unit against movement on the rail.

When the workpiece requires a plurality of holes to be punched therein, a row of such holes can be formed therein by employing a plurality of perforating units which are mounted side by side on the supporting rail, these units being spaced from each other the required distance and the cooperating die and punch of each unit being of a size to suit the requirements of the particular workpiece in hand.

The means heretofore employed for adjusting the perforating units on the supporting rail and fastening them in place were of such construction that it was a difficult operation and required an undue amount of time to mount such units on this rail and remove the same therefrom, particularly when it was necessary to mount an additional perforating unit among the intermediate members of a group of perforating units which are already mounted on the rail.

The present means for adjustably fastening each perforating unit in any desired position on the supporting rail are so constructed that the perforating unit can be directly applied to and removed from this rail without moving the same lengthwise of the rail and without disturbing any other perforating unit which is on either side of the unit to be added to the respective group or row already on the rail.

It will be noted that the dimension of the widest lower part of the two sections of each clamping screw nut crosswise of the adjusting groove is greater than the narrowest upper part of the adjusting groove in the rail when the nut and screw of the bolt are in their operative position, as shown by full lines in Figs. 1, 2 and 3, and it is therefore impossible, while the screw nut sections are transversely in line with each other, to either insert them into the adjusting groove or remove the same therefrom.

The procedure for inserting the coupling sections of the clamping screw nut into the adjusting groove and alining the same preparatory to assembling the same with the clamping screw and perforating unit is as follows:

One of the screw nut sections 44 is first passed downwardly into the adjusting groove which is possible inasmuch as the width of this section from the axis of its threaded inner side to the lower end of its inclined outer side is less than that of the narrowest upper part of the adjusting groove, the insertion of this section into this groove being facilitated by tilting this section, as indicated by full lines at the right of adjusting groove in Fig. 4. Thereafter this screw nut section is moved laterally outward so that its inclined outer side engages with the right hand inclined side of the adjusting groove and underneath the respective overhanging or undercut part of this groove, as indicated by full lines in Fig. 1. The companion screw nut section 44 is now passed in like manner downwardly into the adjusting groove from the narrow top thereof, as indicated by dotted lines at the left of the adjusting groove in Fig. 4, and this screw nut section is moved transversely to the left so as to engage its inclined outer side with the opposite corresponding inclined side of the adjusting groove so as to be overhung by the respective undercut part of the same, as shown by full lines in Fig. 1.

The insertion of the screw nut sections is effected while the same are transversely out of line with each other and their inner sides do not oppose each other, as shown by dotted lines in Fig. 3. After the two sections have been thus inserted independently of each other, into the opposite parts of said adjusting groove, one of these screw nut sections is moved lengthwise relative to the other in the adjusting groove so the same are transversely in line and the screw threads on their inner side are opposite each other, as shown by full lines in Fig. 3. The shoe of the die and punch holder is now placed transversely on the rail and over the alined screw nut sections so that the screw opening 51 in this shoe registers with the threaded opening formed by the threaded recesses 48 on the inner opposing sides of the screw nut sections. The body 50 of the adjusting screw is now passed downwardly through the screw opening 51 in the holder shoe and its threaded lower end engaged with the split threads on the screw nut sections 44 while the head at its upper end is arranged above the holder shoe. Upon now tightening the adjusting screw its head will engage the top of the holder shoe and the screw nut sections will press against opposite sides of the screw body and against opposite sides of the adjusting groove, and firmly secure the perforating unit in place on the rail so that the same will not become displaced while the apparatus is in use. If desired one nut section may be introduced into the adjusting groove so that it is in the correct place where the die and punch holder should be located and this would require moving only the other screw nut section lengthwise in the adjusting groove for alining the screw nut sections.

When it is desired to remove a perforating unit from the rail for sharpening or repairing, or changing the size of its die and punch, or for other purposes, this can be done by first detaching the clamping screw, but if it is desired to also remove the screw nut from the supporting rail this can be done by reversing the procedure above described for assembling the screw nut sections on the supporting rail.

The operation of applying the screw nut sections in the adjusting groove of the rail and removing the same therefrom can be effected quickly and conveniently without necessitating moving the same lengthwise to either end of the supporting rail and without disturbing any of the other perforating units or the parts whereby the same are adjustably secured to the supporting rail, thereby enabling changes in the setup of the perforating mechanism to be effected expeditiously, economically, and conveniently.

Inasmuch as some of the slugs which are produced during the perforating operation are liable to get into the adjusting groove 40 the rail is provided with discharge passages or openings 15 which lead from the bottom of the groove 40 to the front of the rail 14 and through which any slugs that get into this groove may be easily removed.

It is to be understood that this invention may be embodied in a clamping device of this character in which the bolt and nut sections are provided with single pitch threads or a plurality of pitch threads, such as double pitch threads.

In the operation of this clamping device the internal threads of the nut sections progressively press diametrically tighter around the external screw thread of the bolt as the latter is revolved in a stationary plane in a tightening direction while the inclined outer surfaces of the nut sections engage the respective inclinations which are formed lengthwise on the slotted member.

Furthermore the two sections of the split nut may be introduced individually into the undercut groove of the slotted member and then moved laterally so that the same are transversely in line and form a substantially complete nut and their semicircular threads are in full pitch relation to the bottom faces of the halves of said nut and the threads of the two halves are alined to produce continuous threads for cooperation with the threaded part of the bolt.

Moreover, this invention permits of inserting the split nut directly into the groove of the slotted member and also removing the same therefrom when both ends of the slot thereof are closed or obstructed by other parts which may be present in this slot.

I claim as my invention:

1. In a clamping device providing for the longitudinal movement of a screw nut in an undercut slot, said nut being insertable into said slot from the face of said slot at any location along the length of said slot and said screw nut, consisting of two piece construction, either piece of which may be inserted into said slot individually after which the two pieces cooperate to form a substantially completed nut and the pieces of said nut being arranged at all times below the face of the member having the slot.

2. A clamping device consisting of an adjusting groove formed lengthwise in the upper side of a supporting rail, said groove having a flat bottom and its opposite sides inclined to converge upwardly to form an undercut slot of upwardly tapering form, a screw nut split diametrically to form two coupling sections, each of which has a flat underside, a flat top, a vertical inner side, and an inclined outer side, a vertical semicircular recess, provided with substantially one-half of the helical screw thread and two opposite upright transverse sides, a screw, the threads of which engage said nut screw thread to tighten the head of said screw against the member being clamped, when the screw is revolved in a stationary plane in the tightening direction, the inclined faces of said screw nut sections being drawn into increasingly tightening engagement with the companion inclined faces of said groove and into diametrically progressively tightening engagement on said screw thread and the pieces of said nut being of such length that the same will at all times be spaced from the opposing surface of the part which is being clamped.

3. In a clamping device providing for the longitudinal movement of a screw nut in an undercut slot formed in a member to be clamped, means for inserting said nut into said slot from the face of said member when both ends of said slot are obstructed, said means consisting of a screw nut of two piece construction, either piece of which may be inserted into said slot individually after which the two pieces cooperate to form a substantially completed nut, said nut being split diametrically and having two inclined outer surfaces opposing each other to cause the internal threads of said pieces to progressively press diametrically tighter on the screw thread when said screw thread is revolved in a stationary plane in the tightening direction, said faces of said screw units engaging companion inclinations formed lengthwise in said slot, said screw thread being held in said stationary plane due to the screw extending above said slot and having an enlarged head bearing in a clamping action on a holder, as herein described, or other device and the pieces of said nut being of such length that the same will at all times be spaced from the opposing surface of the part which is being clamped.

4. Means for adjustably connecting two members which are movable one relatively to the other and having opposing bearing faces which engage each other, comprising an undercut slot formed in the face of one of said members and having an incline, a split screw nut movable lengthwise in said slot and having an incline engaging with the incline of said slot, and a bolt mounted on the other member and engaging the thread of said split screw nut, the upper end of said screw nut terminating short of the underside of the bearing face of the member which carries said bolt, whereby upon tightening said bolt the opposite parts of said screw nut will be moved inwardly against opposite sides of the bolt and the bearing faces of said members will be drawn against each other for holding the same against movement relative to one another.

5. Means for connecting two members which have bearing faces engaging with each other and are adapted to be moved one relative to the other parallel with said bearing faces, comprising a slot formed lengthwise in the bearing face of one of said members and having its opposite sides inclined and converging upwardly, a split screw nut arranged in said slot and movable lengthwise therein and having its upper end terminating short of the underside of the other member so as to form a clearance space therebetween and each of said screw nut sections having an inclined outer side engaging one of the inclined sides of said slot and provided on its inner side with a semi-cylindrical screw thread, and a bolt having its shank mounted on the other member and provided with a screw thread which engages with the semi-cylindrical screw threads of said nut sections, whereby upon tightening said bolt the sections of said nut will be moved upwardly and wedgingly engage the inclined sides of said slot so that the nut sections are pressed against opposite sides of the bolt shank and said members will be held against relative movement.

GEORGE F. WALES.